United States Patent
Worek et al.

(10) Patent No.: US 9,514,875 B2
(45) Date of Patent: Dec. 6, 2016

(54) INTEGRATED INDUCTOR AND A METHOD FOR REDUCTION OF LOSSES IN AN INTEGRATED INDUCTOR

(75) Inventors: Cezary Worek, Krakow (PL); Slawomir Ligenza, Wolbrom (PL)

(73) Assignee: AKADEMIA GORNICZO-HUTNICZA IM. STANISLAWA STASZICA W KRAKOWIE, Krakow (PL)

( * ) Notice: Subject to any disclaimer, the term of this patent is extended or adjusted under 35 U.S.C. 154(b) by 0 days.

(21) Appl. No.: 14/005,268

(22) PCT Filed: Mar. 22, 2012

(86) PCT No.: PCT/EP2012/055099
§ 371 (c)(1), (2), (4) Date: Oct. 14, 2013

(87) PCT Pub. No.: WO2012/126993
PCT Pub. Date: Sep. 27, 2012

(65) Prior Publication Data
US 2014/0043127 A1     Feb. 13, 2014

(30) Foreign Application Priority Data
Mar. 23, 2011 (PL) .......................... 394316

(51) Int. Cl.
| H01F 17/06 | (2006.01) |
|---|---|
| H01F 27/24 | (2006.01) |
| H02M 3/335 | (2006.01) |
| H01F 27/28 | (2006.01) |
| H01F 27/38 | (2006.01) |

(Continued)

(52) U.S. Cl.
CPC .............. *H01F 27/28* (2013.01); *H01F 27/38* (2013.01); *H02M 3/28* (2013.01); *H02M 2001/0064* (2013.01)

(58) Field of Classification Search
CPC ............ H01F 27/38; H01F 3/14; H01F 38/08; H01F 2017/065; H02M 2001/0064; H02M 2001/0048; H02M 1/4241
USPC ............... 336/178, 180, 181, 182, 183, 184, 212,336/221; 363/15, 21.02, 21.03, 21.08; 361/268
See application file for complete search history.

(56) References Cited

U.S. PATENT DOCUMENTS

| 1,606,777 | A | * | 11/1926 | Payne ............................. 336/83 |
| 3,876,938 | A | * | 4/1975 | Ohta .................. G01S 7/52003 250/336.1 |

(Continued)

*Primary Examiner* — Alexander Talpalatski
*Assistant Examiner* — Joselito Baisa
(74) *Attorney, Agent, or Firm* — Mark M. Friedman (57) ABSTRACT

An integrated inductor comprising a multi-winding inductor having a transformer winding (L1) and a resonant inductor (L2). Sections (I), (2) of the magnetic circuit of the transformer winding (L1) are incorporated into magnetic circuits of at least two parts (L2A), (L2B) of a resonant inductor (L2) so as to form common parts of magnetic circuit of the multi-winding inductor (L1) and at least two-part (L2A), (L2B) resonant inductor (L2), wherein the transformer winding (L1) of the multi-winding inductor is wound around a column (II), which has at least one air gap (G) having a width adapted so that the magnetic induction produced by the at least two-part (L2A), (L2B) resonant inductor (L2) does not exceed 25% of the magnetic induction produced by the transformer winding (L1) of the multi winding inductor.

11 Claims, 5 Drawing Sheets

(51) Int. Cl.
*H02M 3/28* (2006.01)
*H02M 1/00* (2006.01)

(56) References Cited

U.S. PATENT DOCUMENTS

| | | | | |
|---|---|---|---|---|
| 4,975,649 A * | 12/1990 | Bobry | ........................ | G05F 3/06 |
| | | | | 323/309 |
| 5,194,817 A * | 3/1993 | Ward | ................. | G01R 31/1272 |
| | | | | 324/544 |
| 5,225,784 A * | 7/1993 | So | ........................... | H03M 1/80 |
| | | | | 324/657 |
| 5,416,458 A * | 5/1995 | Menke | .................... | H01F 27/34 |
| | | | | 336/12 |
| 6,606,260 B2 * | 8/2003 | Ahlstrom | ............. | H04M 11/025 |
| | | | | 363/125 |
| 6,911,848 B2 * | 6/2005 | Vinciarelli | ............ | H02M 1/088 |
| | | | | 327/108 |
| 7,136,293 B2 * | 11/2006 | Petkov et al. | ................. | 363/126 |
| 7,742,319 B2 * | 6/2010 | Kim | ........................ | H01F 27/38 |
| | | | | 363/126 |
| 7,843,708 B2 * | 11/2010 | Seong | ................. | H02M 3/3376 |
| | | | | 363/127 |
| 8,120,457 B2 * | 2/2012 | Hu et al. | ........................ | 336/178 |
| 2008/0186762 A1 * | 8/2008 | Chuo | ................. | G11C 13/0004 |
| | | | | 365/163 |
| 2009/0167474 A1 * | 7/2009 | Moon | .................... | H01F 38/08 |
| | | | | 336/182 |
| 2011/0063065 A1 * | 3/2011 | Hugues Douglas | ...... | H01F 3/10 |
| | | | | 336/170 |

* cited by examiner

INTEGRATED INDUCTOR AND A METHOD FOR REDUCTION OF LOSSES IN AN INTEGRATED INDUCTOR

TECHNICAL FIELD

The present invention relates to an integrated inductor for use in resonant energy-conversion systems ensuring minimization of losses in a ferromagnetic core and to a method for reduction of losses in an integrated inductor.

BACKGROUND ART

Resonant energy-conversion systems, despite of their advantages, such as sinusoidal currents, soft switching capability, wide operating frequency range, etc., are relatively slowly superseding the classical solutions based on hard switching. The reason is that in a resonant circuit the peak current values are substantially exceeding the maximum load current. Therefore, the reactance elements, both the capacitors and inductors, shall be designed to store relatively large amounts of energy. This problem can be solved by increasing both the weight and dimensions of reactance elements. However, such approach is not economically viable, since it entails additional costs and, consequently, a higher price. A further unfavourable effect is the decrease in energy efficiency, because the increase in the inductive elements dimensions in resonant energy-conversion systems results in considerable losses in windings, particularly at frequencies above 100 kHz. Also increasing the ferromagnetic core dimensions, while maintaining a constant rms value of the magnetic flux density is the reason that losses increase linearly with the core volume. Recently, due to rising electricity prices and legislative measures aimed at limitation of electric power consumption and its rational utilization, the energy efficiency becomes the crucial parameter influencing the potential success of the proposed solution.

The U.S. Pat. No. 5,886,516 presents an integrated multi-winding magnetic element intended for operation in a series resonant converter, in which on a single "UU" gapped magnetic core there are located two windings of an isolation transformer and two additional windings constituting two inductive elements of the resonant circuit. This assembly constitutes a resonant circuit consisting of three inductances, two capacitances and the isolation transformer.

An integrated-magnetic apparatus is known from the U.S. Pat. No. 5,726,615 comprising three ferromagnetic pot cores, two of which have central core-columns carrying two flat windings placed around these columns. These two inductive elements constitute a transformer. The third ferromagnetic pot core has a shorter central core-column around which a flat winding is placed. The third core-piece located adjacent to a flat exterior surface of the transformer allows to form the third inductive element. The third inductive element is partially coupled magnetically through an air gap to the other windings and is phased to have the magnetic induction in the same direction as the magnetic induction in the un-gapped magnetic circuit.

The U.S. Pat. No. 7,525,406 presents a structure that contains a plurality of coupled and non-coupled inductive elements and at least one closed magnetic circuit comprised of mutually contiguous magnetic elements having groves for current conductors in the X-axis and a perpendicular Y-axis. The current conductors located along the same axis exhibit mutual inductance but none between mutually orthogonal axes.

The Polish patent application No. 393133 presents a method for increasing the power transferred by an integrated inductor characterized by positioning an integrated inductor's windings orthogonally with respect to each other and the choice of induction elements values so that magnetic flux of the auxiliary magnetic circuit is transferred through at least a portion of the main magnetic circuit transferring the main magnetic flux while both magnetic induction vectors are oriented orthogonally with respect to each other, in addition both variable in time magnetic induction vectors are shifted with respect to each other in the time domain.

In the article "1 MHz-1 kW LLC Resonant Converter with Integrated Magnetics", Zhang, Yanjun Xu, Dehong Mino, Kazuaki Sasagawa, Kiyoaki, Applied Power Electronics Conference, APEC 2007—Twenty Second Annual IEEE, Feb. 25, 2007-Mar. 1, 2007, pp. 955-961, there is described an integrated magnetic module in which the region of magnetic induction compensation is restricted to a small portion of the magnetic core volume. Moreover, in this element there occurs a problem of large resonant induction values with respect to the transformer induction value and also a relatively large effect of increasing the resistance of copper windings being in magnetic field from air gaps in magnetic circuits.

The article "Planar Integrated Magnetics Design in Wide Input Range DC-DC Converter for Fuel Cell Application", Ziwei Ouyang, Zhe Zhang, Ole C. Thomsen, Michael A. E. Andersen, Ole Poulsen, Thomas Björklund, Energy Conversion Congress and Exposition (ECCE), 2010 IEEE: 12-16 Sep. 2010, pp. 4611-4618, also describes an integrated magnetic module in which the region of magnetic induction compensation is restricted to a small portion of the magnetic core volume. In this solution, a so-called hot spot occurs, where magnetic induction vectors produced by inductive elements of integrated magnetic circuits are summing up.

The above examples illustrate integrated reactances intended for use in resonant DC/DC converters. Nevertheless, said integrated reactances do not fully utilize the multi-winding inductor as an output transformer in resonant energy-conversion systems, and therefore, a reduction of thermal losses in inductive elements of the resonant circuit.

It would be, therefore, advisable to develop an integrated reactance element, characterized by reduced thermal losses in its resonant circuit inductive elements, and suitable for use in resonant DC/DC converters.

DISCLOSURE OF THE INVENTION

The object of the invention is an integrated inductor comprising a multi-winding inductor having a transformer winding and a resonant inductor, wherein sections, of the magnetic circuit of the transformer winding are incorporated into magnetic circuits of at least two parts, of a resonant inductor so as to form common parts of magnetic circuit of the multi-winding inductor and at least two-part, resonant inductor, wherein the transformer winding of the multi-winding inductor is wound around a column, which has at least one air gap having a width adapted so that the magnetic induction produced by the at least two-part, resonant inductor does not exceed 25% of the magnetic induction produced by the transformer winding of the multi-winding inductor.

Preferably, the transformer winding of the multi-winding inductor is wound around the column in a single layer.

Preferably, the transformer winding of the multi-winding inductor is a pitched winding wound around the column.

Preferably, in that the column, over which the transformer winding of the multi-winding inductor is wound, comprises two air gaps at its ends.

Preferably, the integrated inductor it comprises magnetic core-pieces that constitute a magnetic circuit with parallel columns magnetically connected with the yoke whereas the transformer winding of the multi-winding inductor is wound on the column parallel to columns on which the windings, of the resonant inductor are wound.

Preferably, the integrated inductor further comprises columns, parallel to the yoke, with further windings of the resonant inductor which are wound around said columns.

Preferably, the integrated inductor comprises magnetic core-pieces circumferentially arranged around the column having the transformer winding, wherein windings of the resonant inductor are wound on said magnetic core-pieces.

Another object of the invention is a resonant power supply comprising the integrated inductor according to the invention, wherein the multi-winding inductor acts as the output transformer and the inductive element is connected in series through the resonant inductor with transistor switches.

The invention also relates to a method for reduction of losses in an integrated inductor comprising a multi-winding inductor having a transformer winding and a resonant inductor, wherein sections, of the magnetic circuit of the transformer winding are incorporated into magnetic circuits of at least two parts, of the resonant inductor so as to form common parts of magnetic circuit of the multi-winding inductor and at least two-part resonant inductor wherein the transformer winding of the multi-winding inductor is wound around a column, which has at least one air gap having a width which is adapted so that the magnetic induction produced by the at least two-part, resonant inductor does not exceed 25% of the magnetic induction produced by the transformer winding of the multi-winding inductor.

BRIEF DESCRIPTION OF DRAWINGS

The invention is shown by means of exemplary embodiments on a drawing, in which.

MODES FOR CARRYING OUT THE INVENTION

Figure 1:
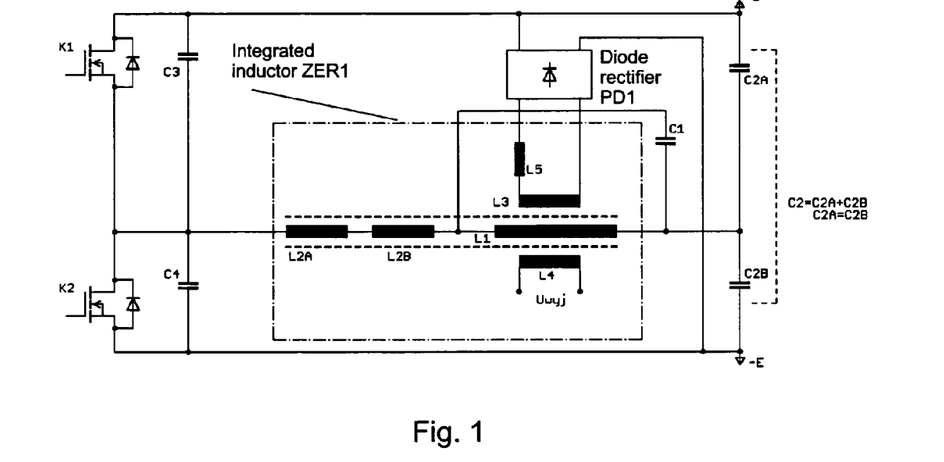
FIG. 1 shows a half-bridge structure of a multi-resonance power supply with a quality-factor limiter based on an integrated inductor ZER according to the first embodiment.

FIG. 1 shows the first example of application of the integrated inductor according to the invention in a resonant-mode power supply circuit. The integrated inductor ZER1 comprises a resonant inductor L2 consisting of two inductive elements L2A and L2B connected in series and a multi-winding inductor, which also acts as the output transformer, composed of three inductive elements L1, L3, L4 having a common magnetic circuit. The inductive element L1 is connected in series through the inductor L2=L2A+L2B with transistor switches K1, K2; the output winding L4 and the quality-factor limiter winding L3 and the inductor L5 are connected to the diode voltage limiter PD1. The primary winding is also connected with the capacitive circuit C2=C2A+C2B. Due to a series connection of the capacitive circuit C2=C2A+C2B with the inductor L2=L2A+L2B, the resulting impedance of these elements is strongly dependent on frequency, which allows controlling the voltage provided to the secondary winding L4 of the multi-winding inductor. Because at resonance, the value of the voltage at the winding of the multi-winding inductor may achieve high values, a circuit for limiting good has been employed, which forms a control winding L3 connected with the inductor L5 and a diode viotabe limiter PD1.

Figure 2:
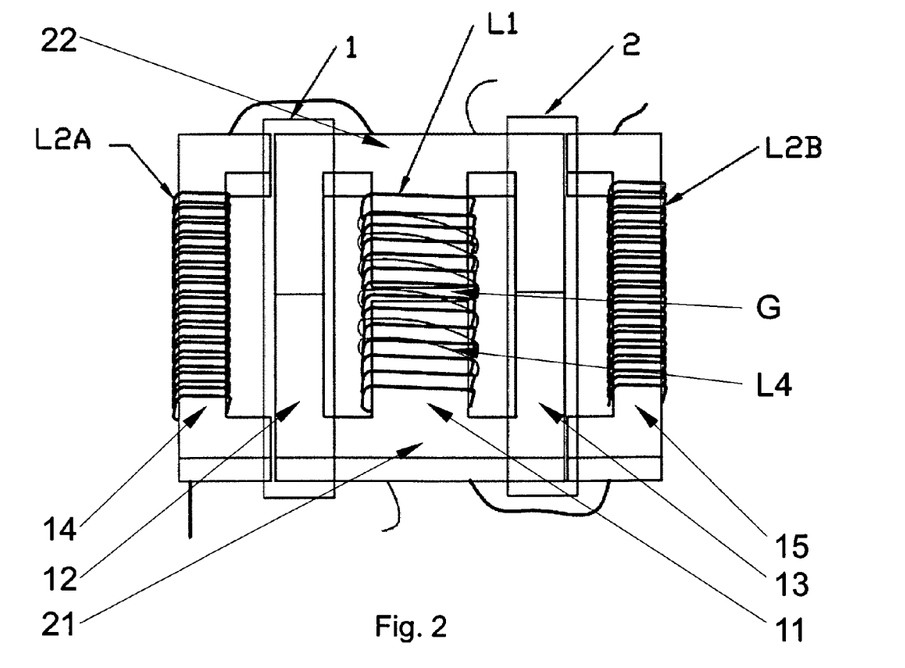
FIG. 2 shows the first embodiment of the integrated inductor wherein variable magnetic inductions produced by the multi-winding inductor, which also functions as an output transformer, and by the resonant inductor, are oriented parallel with respect to each other in such a manner that the resultant time-variable vector of both magnetic inductions attains its minimum value.

FIG. 2 shows the first embodiment of the integrated inductor according to the invention. The integrated inductor comprises two "E" shaped core-pieces assembled with their legs joined together and two "U" shaped core-pieces whose legs are joined to the corners of said two "E" shaped core-pieces. These core-pieces constitute columns 11, 12, 13, 14, 15 parallel with respect to each other whereas the multi-winding inductor winding L1 is wound around the column 11. The intermediate columns 12, 13 have no windings. Around outer columns 14, 15 there are wound windings L2A, L2B of the two-part resonant inductor L2. Columns 11-15 are connected by means of yokes 21, 22 that close the magnetic circuit. Such configuration ensures minimum leakage flux from the multi-winding inductor whereof the main flux closes within the "E" core-pieces. Furthermore, the multi-winding inductor magnetic circuit comprises at least one air gap G that enables controlling the maximum magnetic induction value in the magnetic core and therefore power losses occurring in the core. The width of the air gap G is chosen so that magnetic induction produced by the at least two-part L2A, L2B resonant inductor L2 does not exceed 25% of the magnetic induction produced by the multi-winding inductor's transformer winding L1. Moreover, such construction with a single-layer, preferably pitched, winding having a break over the air gap minimizes the magnetic coupling between magnetic elements, ensures symmetry of the windings and minimizes the losses associated with the influence of magnetic field around the air gap. The resonant inductor winding utilizes two "U" shaped core-pieces on which the windings L2A and L2B are placed. In the embodiment shown in FIG. 3 and FIG. 4 the preferable directions of magnetic induction produced by the integrated inductor windings are depicted in the form of curves drawn in dashed lines with arrowheads indicating the direction, while in FIG. 3 the current flows only through the element L1, whereas in FIG. 4 through elements L1 and L2. An advantageous feature of the integrated inductor shown in FIG. 2 is the ease of adjustment to different values of power transferred by means of typical magnetic elements of a suitable size. Due to parallel positioning of the multi-winding inductor winding L1 with respect to resonant inductors' windings L2A and L2B, the magnetic inductions produced by these windings are also parallel oriented. The winding L3, most often wound over the L1 winding, is not shown in FIG. 2 to increase its clarity. Furthermore, depending on the phase shift between both magnetic induction vectors achieved by means of an appropriate choice of relative values of the reactance elements incorporated in the resonant-mode power supply or by choice of an appropriate topology, the amplitude of magnetic induction can be reduced within a certain range and, consequently, a reduction of losses in the magnetic core can be achieved. For this purpose, the phase shifts between the magnetic inductions superimposing in a selected portion of the magnetic circuit are chosen so as to achieve the smallest possible losses. Preferably, the phase shift between magnetic induction vectors produced by inductors L1 and L2 is basically 180°.

It is well known to describe the losses in a ferromagnetic core by the equation:

$$P_V = P_{V,histerezy} + P_{V,prara-wirowe} + P_{V,resztkowe}$$

The losses $P_V(B,f,T)$ in a ferromagnetic core depend primarily on the magnetic induction B, the magnetic field frequency f and the core temperature T, whereas:

$$P_V(B) \approx B^{2+y} \text{ where } y \in [0,1]$$

$$P_V(f) \approx f^{1+x} \text{ where } x \in [0,1]$$

$P_V(T)$ attains its minimum near 90° C.

In the resonant-mode power supply according to FIG. 1 it is possible to achieve a constant phase shift of ca.+/−90° between the current in the inductor L2A and L2B and the current in the multi-winding inductor winding L1. Assuming equal amplitudes of the magnetic induction vectors, the resultant magnetic induction amplitude in the magnetic circuit portion where both magnetic fluxes are superimposing is:

$$B_{12}(t) = B_A \cdot (\sin \omega t + \cos \omega t) = B_A \cdot \sqrt{2} \cdot \sin(45° + \omega t) = B_{A12} \cdot \sin(45° + \omega t)$$

$$B_{A12} = B_A \cdot \sqrt{2}$$

Assuming both induction vectors are on the same plane but opposite in phase (a 180° phase shift) and assuming for sinusoidal waveforms the same amplitude of the inductions associated with coils (L1) and (L2=L2A+L2B) $B_{A1} = B_{A2} = B_A$, and if magnetic fields are shaped so that they cancel out, the resultant magnetic induction $B_{12}(t)$ in certain regions is $B_{A12}$:

$$B_{12}(t) = B_A \cdot (\sin \omega t - \sin(\omega t)) = B_{A12} \cdot 0 = 0$$

The integrated inductor according to the invention has a particularly desirable feature that two inductive elements L2A, L2B utilize portions 1 and 2 of the multi-winding inductor and losses in common branches of magnetic circuits can be substantially reduced by means of reduction of the magnetic induction vector amplitude.

Figure 3:
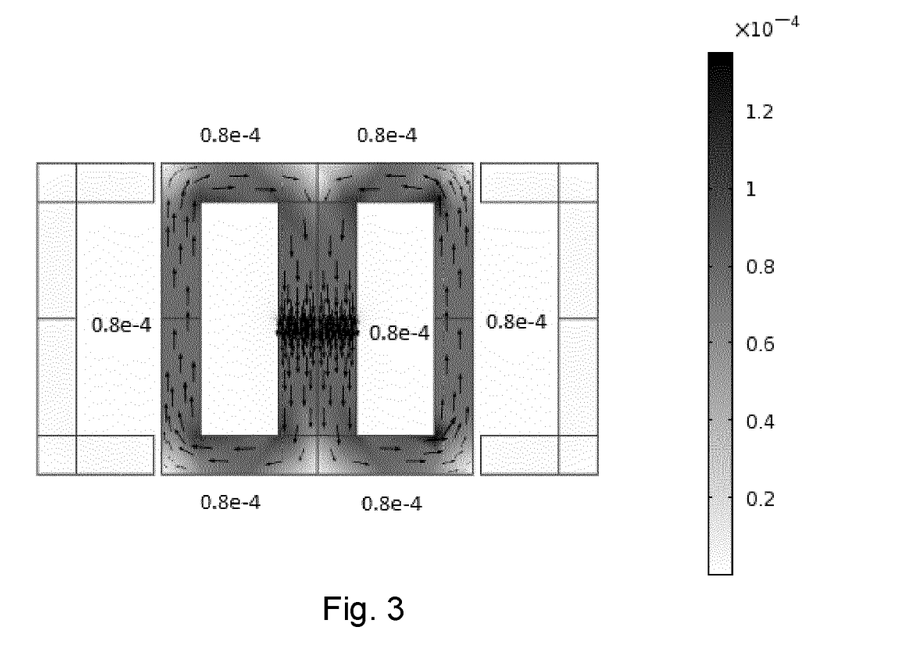
FIG. 3 shows exemplary simulation of magnetic induction distribution in the integrated inductor according to the first embodiment wherein the current flowing in the resonant inductor L2=L2A+L2B equals 0 arbitrary units, whereas the current flowing in the L1 coil equals 0.67 arbitrary units. The central column of the magnetic core incorporates an air gap.
Figure 4:
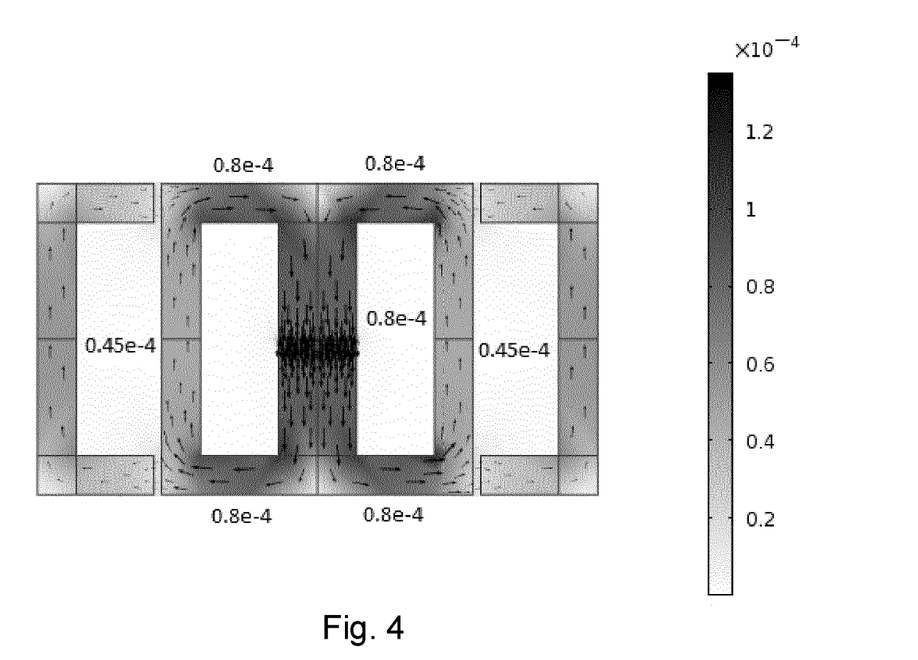
FIG. 4 shows exemplary simulation of magnetic induction distribution in the integrated inductor according to the first embodiment, wherein the current in the resonant inductor L2=L2A+L2B equals 1 arbitrary unit, whereas the current in the L1 coil equals 0.67 arbitrary units. The magnetic core central column incorporates an air gap and the directions of currents are chosen so that they are opposite in phase (a 180° phase shift).

FIG. 3 and FIG. 4 show results of simulation of the magnetic induction vector distribution in the integrated inductor according to the invention. FIG. 3 illustrates the integrated inductor condition when the resonant inductor L2=L2A+L2B current equals 0 arbitrary units and the coil L1 current is 0.67 arbitrary units. The central column of the magnetic core incorporates an air gap. This is the initial condition, which is the basis for comparison because there are no compensating magnetic inductions from the resonant inductor.

FIG. 4 shows simulation of the magnetic induction vector distribution in the integrated inductor in which the resonant inductor L2=L2A+L2B current equals 1 arbitrary unit and the current in coil L1 is 0.67 arbitrary units. The central column of the magnetic core incorporates an air gap and directions of currents in windings L1 and L2 are chosen so that they are phase-shifted by 180°. In the external branches of the ferromagnetic core, the magnetic induction current has been decreased from a value of 0.8 arbitrary units to the value of 0.45 arbitrary units. In such a situation, it is possible to assess a relative change of the power of losses, assuming that there is a square relationship between the value of power of losses in the core and the value of the magnetic induction:

$$P_V(B) \approx B^2$$

If, for example, the magnetic induction amplitude is reduced within 33% of the core volume and the magnetic induction amplitude decreases from 0.8 arbitrary units to 0.45 arbitrary units then, due to the reduction of magnetic induction within 33% of the core volume, thermal losses in chosen portions of the magnetic circuit decrease by 67% and by 20% in the whole core.

Figure 5:
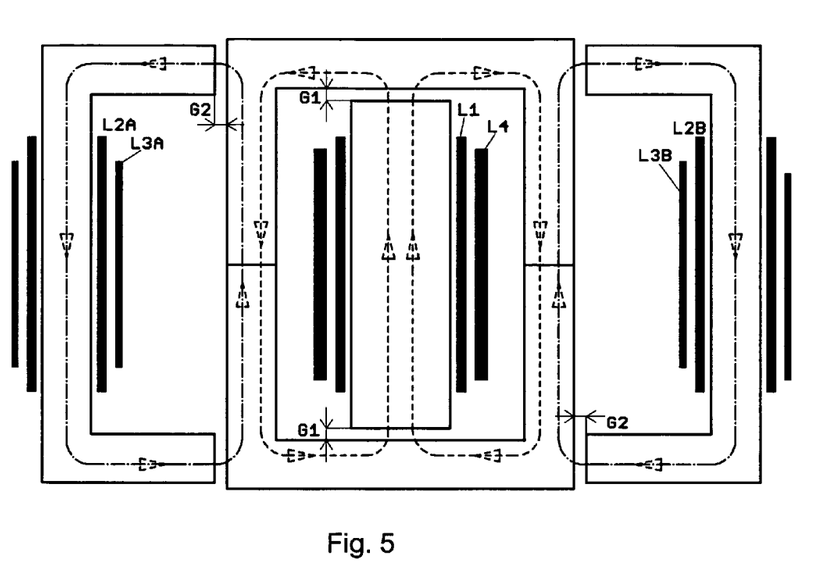
FIG. 5 shows schematically the second embodiment of the integrated inductor.
Figure 6:
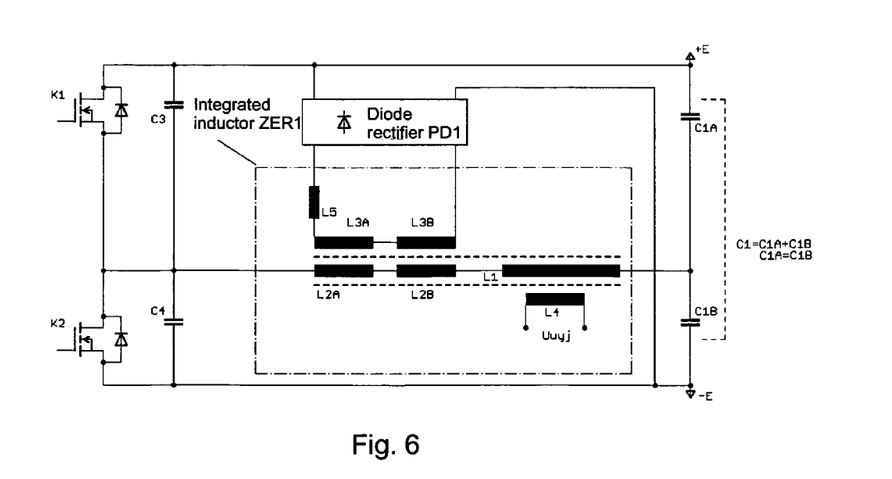
FIG. 6 shows the example of its application in a resonant power supply circuit.

FIG. 5 shows schematically the second embodiment of the integrated inductor, and FIG. 6 shows the example of its application in the resonant power supply circuit. The second embodiment is equivalent to the first one except for the fact that it contains two air gaps G1 located at the ends of the column 11, between the magnetic element of column 11 and the yoke 21, 22. The advantage of this solution over the configuration comprising a single gap G in the middle of the column 11 is that it allows to achieve the self-screening effect of magnetic field from air gaps (reduction in electromagnetic emission, minimization of losses associated with magnetic field near the air gap and minimization of couplings between magnetic elements through the external yoke) and allows to maintain a symmetry of magnetic fields distribution (equal number of volts-per-turn, independently on the position on the column). The second embodiment, similarly as the first one, comprises air gaps G2 in the yoke connecting the column 11, around which the transformer windings are wound, with the columns 14 and 15 with the resonant inductor windings L2A, L2B. The direction of magnetic induction produced by the transformer winding L1 is shown with a dashed line and the direction of magnetic induction produced by the resonant inductor windings L2A, L2B is represented by a dashed-and-dotted line. In the second embodiment the height of the column 11 is larger than the distance between the column 11 and columns 14, 15, and therefore the transformer winding L1 can be wound as a single-layer winding or, in the case of a larger length of the column 11, as a pitched winding. A single-layer wound transformer winding L1 allows to reduce windings losses (reduction of the proximity effect) and also to attain as large as possible relative length of the common magnetic path (losses reduction in magnetic material) and enables a flat, planar construction. Reduction in parasitic capacitances of the transformer windings enables to increase the operating frequency.

Figure 7:
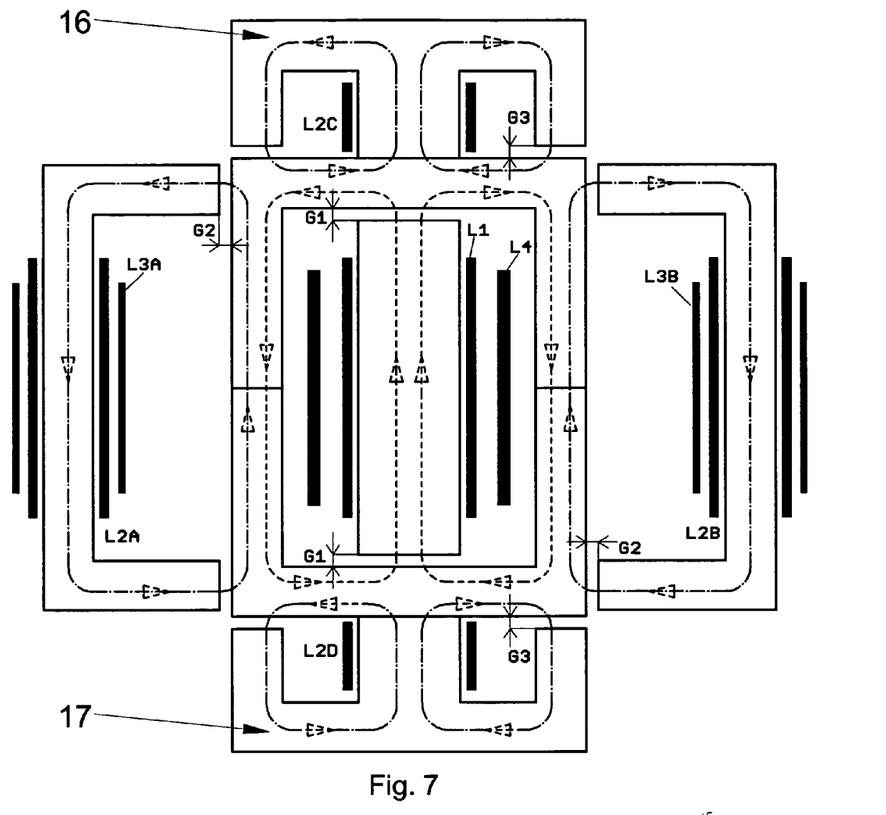
FIG. 7 shows schematically the third embodiment of the integrated inductor.
Figure 8:
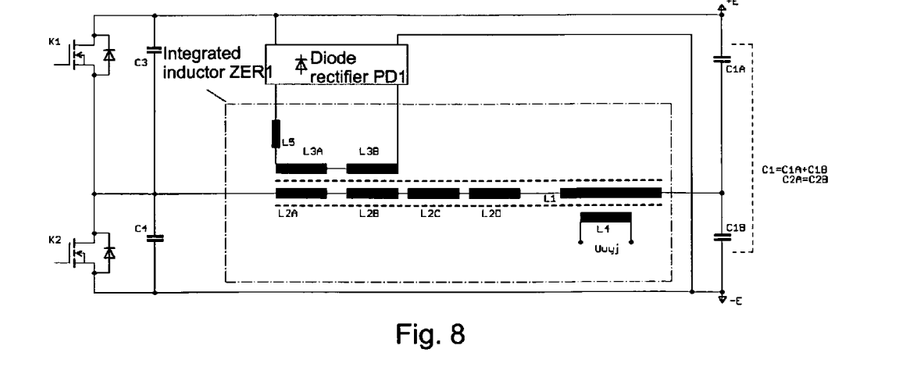
FIG. 8 shows the example of its application in a resonant power supply circuit.

FIG. 7 shows schematically the third embodiment of the integrated inductor, and FIG. 8 shows the example of its application in the resonant power supply circuit. The integrated inductor according to the third embodiment differs from the integrated inductor according to the second embodiment in that it has a four-element resonant inductor which, apart of windings L2A, L2B wound around columns 14, 15 parallel to the column 11, has also windings L2C, L2D wound around columns 16, 17 parallel to the yoke 12, 13. That allows to additionally increase the volume of the magnetic material in which the reduction of magnetic induction occurs and, consequently, reduction of losses in the magnetic core.

Since under resonance conditions the voltage across the multi-winding inductor may attain large values, the solution incorporates a quality-factor limiting circuit that consists of the control winding L3 connected with inductor L5 and a diode voltage limiter PD1.

Figure 9:
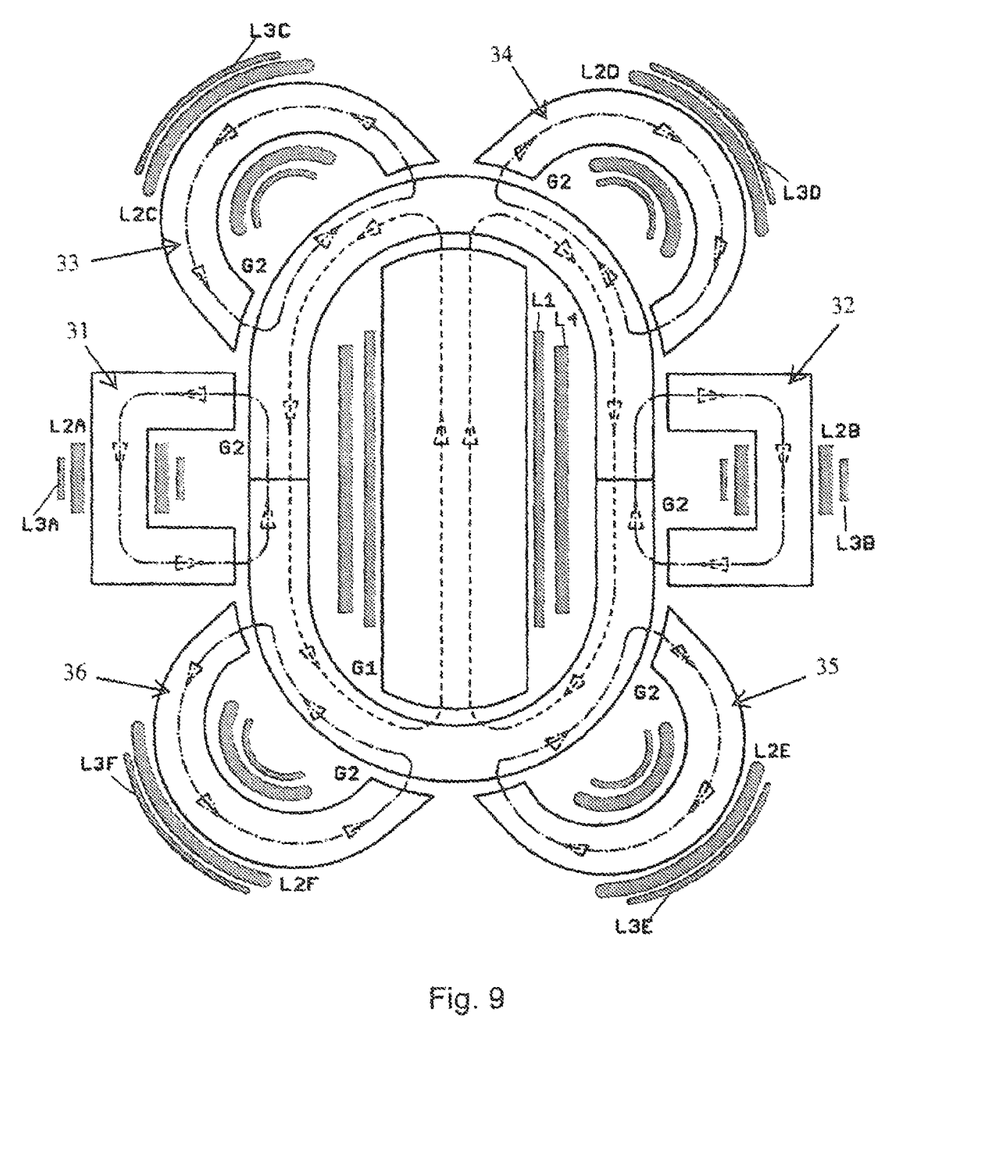
FIG. 9 shows schematically the fourth embodiment of the integrated inductor's spatial structure.

FIG. 9 shows schematically the fourth embodiment of the integrated inductor's spatial structure wherein the six-part resonant inductor's windings L2A, L2B, L2C, L2D, L2E, L2F are wound around columns 31, 32, 33, 34, 35, 36, arranged circumferentially around the column 11 carrying the transformer winding. The columns 31-36 can be curvilinear and in this embodiment they have the form of a half of a torus and thus facilitate the construction of a bobbin (also in the toroidal form) and winding of coils, and enable achieving significant reduction in core losses. The circumferential arrangement of columns 31-36 allows minimization of air gaps and thus effective reduction of magnetic flux leakage from the integrated magnetic element as well as compact, low profile construction and, consequently, substantial reduction of parasitic inter-turn capacitances.

The invention claimed is:

1. An integrated inductor power supply apparatus comprising:
    two resonant inductors (L2A, L2B) connected in series, each comprising an inductor winding;
    a transformer comprising:
        a transformer winding (L1) as a primary winding connected in series with the two resonant inductors (L2A, L2B); and
        an output winding (L4) as a secondary winding;
    capacitors (C1, C2, C3, C4) connected with the resonant inductors (L2A, L2B) and the transformer winding (L1) to form a resonant circuit;
    an alternating current power source connected to the resonant circuit;
    wherein the resonant inductors and the transformer are integrated as a multi-winding inductor, the multi-winding inductor comprising:
        a magnetic core comprising:
            a central column (11);
            intermediate columns (12, 13) connected by yokes (21, 22) to the central column (11) at opposite sides of the central column (11) to form an internal closed magnetic circuit;
            at least two outer columns formed by C-shaped (14, 15) magnetic core pieces, the at least two outer columns connected at the opposite sides of the central column (11) to the internal closed magnetic circuit to form at least two external closed magnetic circuits;
            wherein at least one first air gap (G, G1) is formed in the central column (11);
            wherein second air gaps (G2) are formed between the internal closed magnetic circuit and the C-shaped (14, 15) magnetic core pieces; and
            wherein the intermediate columns (12, 13) connected by yokes (21, 22) form a continuous magnetic circuit;
        the transformer winding (L1) and the output winding (L4) wound around the central column (11),
        the two resonant inductor windings (L2A, L2B), each wound around a respective one of the C-shaped (14, 15) magnetic core pieces that are separated magnetically from each other by the second air gaps (G2) and the continuous magnetic circuit;
    wherein the multi-winding inductor is configured such that when in use, while alternating currents flow simultaneously through the transformer winding (L1) and the resonant inductor windings (L2A, L2B), a magnetic induction of the internal magnetic circuit overlaps with and is reduced by a magnetic induction of the external magnetic circuits in an area of common parts (1, 2) of the magnetic core wherein the common parts (1, 2) are located at opposite sides of the central column (11); and,
    wherein the first air gap (G) or the pair of the first air gaps (G1) have a width adapted so that the magnetic induction produced by the resonant inductor windings (L2A, L2B) does not exceed 25% of the magnetic induction produced by the transformer winding (L1) in the central column (11) while alternating currents flow simultaneously through both the transformer winding (L1) and the resonant inductor windings (L2A, L2B).

2. The apparatus according to claim 1, wherein the transformer winding (L1) is wound around the central column (11) in a single layer.

3. The apparatus according to claim 2, wherein the transformer winding (L1) is a pitched winding wound around the central column (11).

4. The apparatus according to claim 1, additionally comprising: E-shaped (16, 17) magnetic core pieces; and the central column (11), the intermediate columns (12, 13) and the yokes (21, 22) are formed by the E-shaped magnetic core pieces connected at the ends of the top and bottom arms of each of the E-shaped magnetic core piece.

5. The apparatus according to claim 1, wherein the central column (11) is formed by an I-shaped magnetic core piece and the intermediate columns (12, 13) and the yokes (21, 22) are formed by two of the C-shaped magnetic core piece connected by ends of their arms.

6. The apparatus according to claim 4, wherein two outer columns formed by the C-shaped (14, 15) magnetic core pieces are arranged at opposite sides of the central column (11).

7. The apparatus according to claim 1, wherein the two outer columns formed by C-shaped magnetic core pieces (14, 15) are oppositely disposed about the central column (11).

8. The apparatus according to claim 1, wherein two pairs of oppositely-arranged outer columns formed by the C-shaped magnetic core pieces (14, 15) are arranged around the internal closed magnetic circuit.

9. The apparatus according to claim 1, wherein a plurality of the C-shaped magnetic core pieces (31-36) are arranged circumferentially around the internal closed magnetic circuit.

10. A resonant power supply comprising:
    two resonant inductors (L2A, L2B) connected in series, each comprising an inductor winding;
    a transformer comprising:
        a transformer winding (L1) as a primary winding connected in series with the two resonant inductors (L2A, L2B); and
        an output winding (L4) as a secondary winding;

capacitors (C1, C2, C3, C4) connected with the resonant inductors (L2A, L2B) and the transformer winding (L1) to form a resonant circuit;

an alternating current power source connected to the resonant circuit;

wherein the resonant inductors and the transformer are integrated as a multi-winding inductor comprising:

a magnetic core comprising:

a central column (11);

intermediate columns (12, 13) connected by yokes (21, 22) to the central column (11) at opposite sides of the central column (11) to form an internal closed magnetic circuit;

at least two outer columns formed by C-shaped (14, 15) magnetic core pieces, the at least two outer columns connected at the opposite sides of the central column (11) to the internal closed magnetic circuit to form at least two external closed magnetic circuits;

wherein at least one first air gap (G, G1) is formed in the central column (11);

wherein second air gaps (G2) are formed between the internal closed magnetic circuit and the C-shaped (14, 15) magnetic core pieces; and wherein the intermediate columns (12, 13) connected by yokes (21, 22) form a continuous magnetic circuit;

the transformer winding (L1) and the output winding (L4) wound around the central column (11), the two resonant inductor windings (L2A, L2B), each wound around a respective one of the C-shaped (14, 15) magnetic core pieces that are separated magnetically from each other by the second air gaps (G2) and the continuous magnetic circuit;

wherein the multi-winding inductor is configured such that when in use, while alternating currents flow simultaneously through the transformer winding (L1) and the resonant inductor windings (L2A, L2B), a magnetic induction of the internal magnetic circuit overlaps with and is reduced by a magnetic induction of the external magnetic circuits in an area of common parts (1,2) of the magnetic core wherein the common parts (1, 2) are located at opposite sides of the central column (11);

wherein the first air gap (G) or the pair of the first air gaps (G1) have a width adapted so that the magnetic induction produced by the resonant inductor winding (L2A, L2B) does not exceed 25% of the magnetic induction produced by the transformer winding (L1) in the central column (11) while alternating currents flow simultaneously through both the transformer winding (L1) and the resonant inductor windings (L2A, L2B); and, wherein the transformer winding (L1) is connected in series through the resonant inductor windings (L2A, L2B) with transistor switches (K1, K2).

11. The resonant power supply of claim 10, additionally comprising: at least two additional outer columns formed by E-shaped (16, 17) magnetic core pieces, the at least two additional outer columns connected to the internal closed magnetic circuit to form at least two external closed magnetic circuits.

* * * * *

UNITED STATES PATENT AND TRADEMARK OFFICE
CERTIFICATE OF CORRECTION

PATENT NO. : 9,514,875 B2  
APPLICATION NO. : 14/005268  
DATED : December 6, 2016  
INVENTOR(S) : Cezary Worek Page 1 of 1

It is certified that error appears in the above-identified patent and that said Letters Patent is hereby corrected as shown below:

Claim 10, Column 10 should be corrected as follows:
Line 16:
Change:
-- winding --
to:
"windings"

Signed and Sealed this
Eighteenth Day of April, 2017

Michelle K. Lee
*Director of the United States Patent and Trademark Office*